June 17, 1947.  T. O. SUMMERS, JR  2,422,267
GYROSCOPE CAGING DEVICE
Original Filed Oct. 22, 1942  2 Sheets-Sheet 1

INVENTOR.
THOMAS O. SUMMERS, JR.,
BY
ATTORNEY.

June 17, 1947.    T. O. SUMMERS, JR    2,422,267
GYROSCOPE CAGING DEVICE
Original Filed Oct. 22, 1942    2 Sheets-Sheet 2

INVENTOR.
THOMAS O. SUMMERS, JR.,
BY
ATTORNEY.

Patented June 17, 1947

2,422,267

UNITED STATES PATENT OFFICE 2,422,267

GYROSCOPE CAGING DEVICE

Thomas O. Summers, Jr., Los Angeles, Calif., assignor to Lear, Incorporated, Grand Rapids, Mich., a corporation of Illinois Original application October 22, 1942, Serial No. 462,943. Divided and this application July 31, 1944, Serial No. 547,451

8 Claims. (Cl. 74—5)

This invention relates to gyroscopic instruments and more particularly gyroscope-caging devices.

An object of my present invention is to provide a caging device for a gyroscopic instrument, of unusually efficient, compact and simple design and of such a nature that it affords the utmost convenience to the operator in effecting positive and dependable caging of the instrument.

A more detailed object in this connection is to provide a caging device for a gyroscopic instrument, of the general character indicated, which is designed to operate upon the principle of bringing an erecting force to bear upon the gyroscope in such direction that the gyroscope actually erects itself to that position in which a detent enters a suitable socket and thereby locks the gyroscope in caged position.

A further object is to provide a caging device as described, which will function automatically and regardless of the position of the gyroscope within its casing so as to cause the gyroscope to erect itself to that position in which the caging device can become effective.

Yet another object is to provide a caging device of the general character indicated, which derives the energy for its actuation from the rotor of the gyroscope itself, thus avoiding the necessity of supplying an additional source of energy to insure operation of the caging mechanism.

A still further object of the present invention is to provide a caging device which, while capable of being used to advantage in conjunction with numerous types of mechanisms which should be locked in fixed position when out of service, is especially advantageous for use with and as a part of a gyro vertical wherein the erecting mechanism takes the form of one or more masses actuated by gravity to bear against the gyro, and thus exert a torque thereon when the gyro becomes displaced from predetermined position. It is in cooperative association with a gyro vertical of such a nature that the caging device of the present invention is disclosed in my co-pending application, Serial Number 462,943, filed October 22, 1942, of which the present application is a division.

The invention possesses other objects and valuable features, some of which, with those enumerated, will be set forth in the following description of the preferred embodiment of my invention illustrated in the drawings accompanying and forming a part of the specification. It is to be understood that I do not limit myself to the showing made by said drawings and description but that I may adopt variations of the preferred form within the scope of my invention as defined by the claims.

Referring to the drawings.

Figure 1:
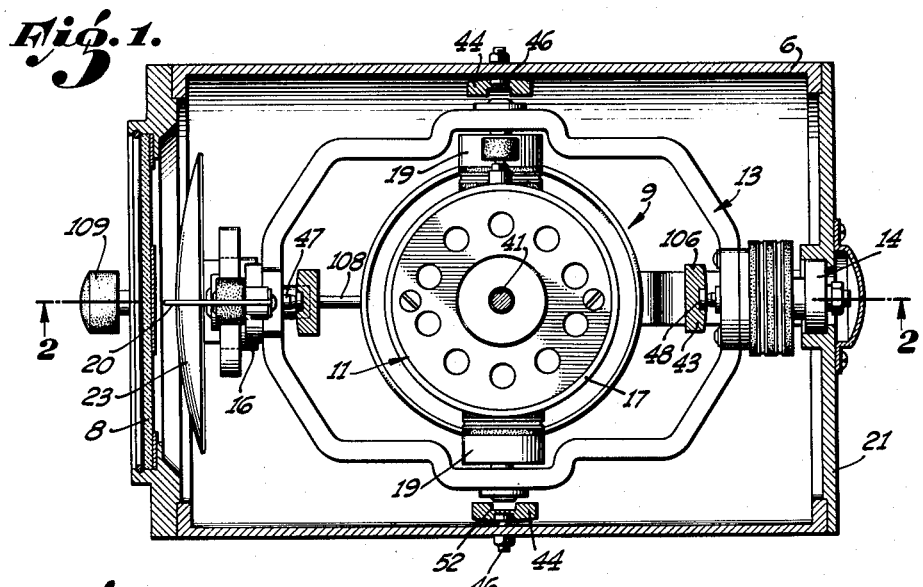
Figure 1 is a horizontal, medial sectional view taken through the casing of a gyroscopic instrument having a caging device incorporating the principles of the present invention operatively associated therewith and showing the internal, operating mechanism in top plan.
Figure 2:
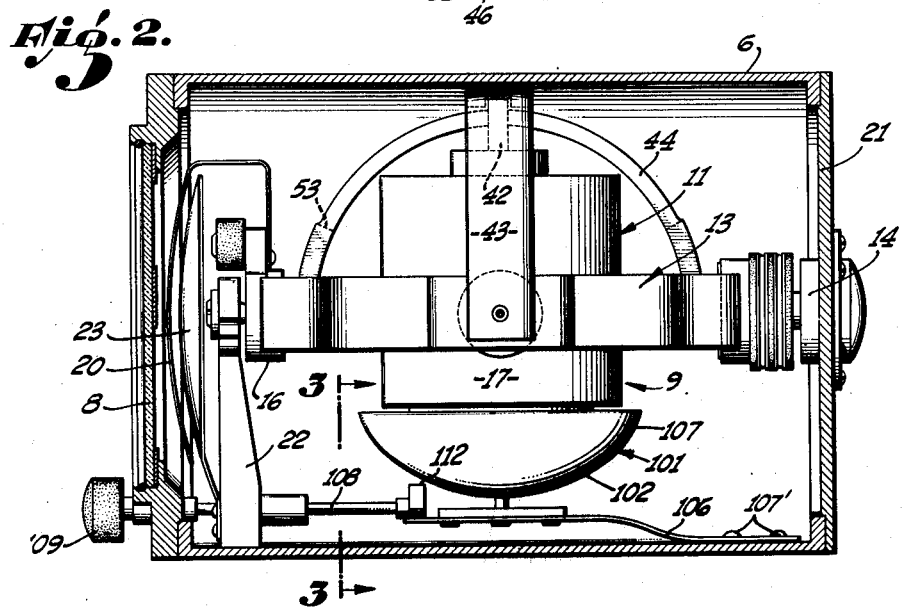
Figure 2 is a view in side elevation of the internal operating mechanism of the instrument of Figure 1, the housing of the instrument being shown in longitudinal, medial, vertical section taken upon the line 2—2 of Figure 1, with the direction of view as indicated.

As in my said co-pending application, Serial Number 462,943, filed October 22, 1943, the caging device of the present invention is illustrated and described in cooperative association with a gyro vertical construction indicated in its entirety at 9, which is encased within a suitable housing 6, preferably of such size and configuration that it is adapted for mounting upon the instrument panel of an aircraft. The gyro vertical 9 comprises a gyroscope 11 supported for freedom of movement about mutually perpendicular horizontal axes and substantially in neutral equilibrium, through the expedient of a gimbal construction 13, which is supported as by axially aligned bearings 14 and 16 for oscillation about a horizontal, major axis. The rotor-bearing casing 17 of the gyroscope 11 is supported in the gimbal 13 for oscillation about a minor axis which is perpendicular to that of the bearings 14 and 16, as by axially aligned bearings 19.

Whereas convenience is afforded by mounting the after bearing 14 for the gimbal ring 13 in the after wall 21 of the housing 6, it is preferable to support the forward bearing 16 by means of a post 22 rigid with the housing 6 and extending radially inwards therefrom. This post 22 is in such position within the housing 6 with respect to the longitudinal dimension thereof, that a space is left between the post 22 and a window 8 in the front wall of the housing to accommodate an indicating device such as a gyroscopically stabilized indicating bar 20 and a suitable background shield 23, which conceals the operating mechanism of the instrument from view.

It might here be explained that inasmuch as the caging device of the present invention is applicable with equal efficacy to several different types of gyroscopic instruments, the indicating bar 20 chosen for illustration is more or less diagrammatic and is here shown in an exemplary, and not in a limiting, sense.

In the modification here being described, the gyroscope 11 is of the electrically driven type; hence the rotor 12 thereof includes a core 31 supporting windings 32 of suitable design which are cooperatively associated with stator windings 33, so that when energized, the rotor 12 is caused to spin at suitable speed. Means are provided for conducting energizing current to the motor 34, of which the described rotor and stator windings, 32 and 33, respectively, are essential parts; but inasmuch as the details of the means for energizing the motor form no portion of the present invention, no need arises for the inclusion here of either description or illustration of the energizing circuit.

Figure 4:
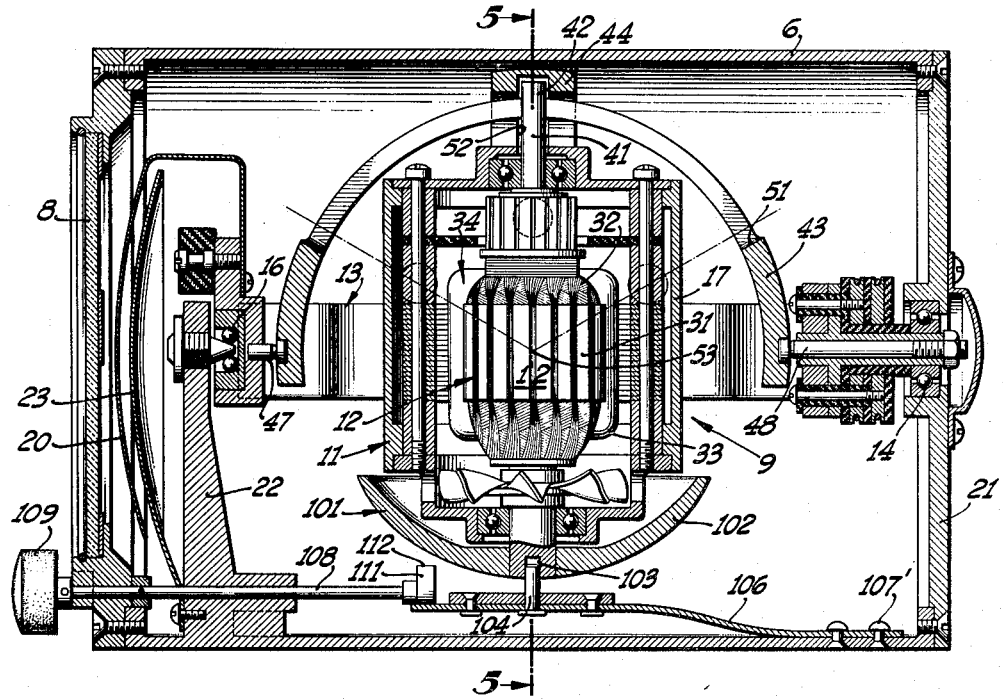
Figure 4 is a longitudinal, medial, vertical sectional view of both housing and the operating mechanism thereinside.
Figure 5:
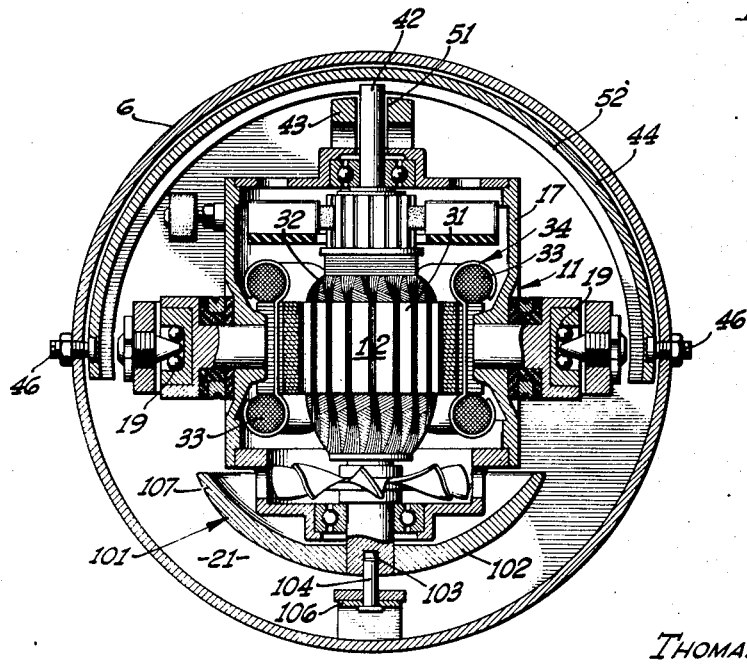
Figure 5 is a transverse, vertical sectional view taken on the line 5—5 of Figure 4 with the direction of view as indicated.

The erecting mechanism of the gyro-vertical 11 comprises a rotor 42 which conveniently can be provided as a continuation of the shaft 41 of the gyro rotor 12, and a pair of crossed, substantially semi-circular stators 43 and 44, respectively. The outer stator mass 44 is journalled upon a pair of pins 46 carried by the housing 6 of the instrument, which are axially aligned with each other and with the minor gimbal bearings 19 when the gimbal 13 is disposed horizontally. The inner stator mass 43 is slightly smaller than the outer stator 44 so that it can move independently thereof and is carried by a pair of axially aligned pins 47 and 48 which are carried by the gimbal ring 13 in axial alignment with the bearings 14 and 16 by which the ring 13 is journalled. In order that the rotor 42 of the erecting mechanism may engage both of the stator masses 43 and 44, it extends through a longitudinally extending slot 51 in the inner stator mass 43 and therebeyond into a slot 52 in the under surface of the outer stator mass 44, as best shown in Figures 4 and 5. The parts are so proportioned and arranged that the centers of the arcs described by both stators 43 and 44 both lie in the point (indicated at 53) of intersection of the major and minor gimbal axes, with the result that if relative rotary motion of the gyroscope about either or both of the gimbal axes occurs, the alignment of the rotor 42 with the stators 43 and 44 will not be altered.

Since both stators 43 and 44 extend upwards from their respective journal supports, they are in unstable equilibrium. Consequently, whenever any wandering of the gyroscope 11 occurs, removing the axis of rotation of the shaft 41 from its normally vertical position, either or both of the stators 43 and 44 will be carried in that same direction in rotary motion about their respective axes, by the engagement of the rotor 42 therewith, whereupon gravity will press the upper side of the slot of whichever stator is thus moved against the side of the rotor 42 which trails during that displacement. This engagement between the stator and the rotating upper end 42 of the shaft 41 will develop friction, thereby generating a force which is exerted by the stationary mass 43 or 44, or both, as the case might be, against the rotor 42, which, it should be remembered, is a portion of the freely suspended body. That force, or the resultant which constitutes the combination of forces in the event that both stators 43 and 44 are acting simultaneously, will be exerted tangentially against the rotor 42 and therefore in a direction perpendicular to the precedent displacement of the gyroscope. It is a well-known principle of gyroscopic action that if an erecting torque is exerted against a gyroscope, the gyroscope will immediately precess in a direction perpendicular to the direction in which the erecting torque is exerted. Consequently, if the gyroscope rotor 12 is spinning in a clockwise direction as viewed in Figure 1, and if the gyroscope wanders in a clockwise direction as viewed in Figure 5, the longitudinally extending stator 43 also swings to the right as viewed in Figure 5, causing the trailing edge of the slot 51 therein to bear against the rotor 41, thereby developing a frictional thrust exerted by the stator 43 against the rotor 42 in a direction perpendicular to the direction in which the stator has been displaced from the vertical, and to the left as viewed upon Figure 4. This will cause the gyroscope to precess, swinging it back about the horizontal major gimbal axis in counter-clockwise direction as viewed in Figure 5, thereby returning itself to that position in which the axis of its shaft 41 is substantially vertical, at which time the pressure of the mass 43 against the rotor will cease, and the erecting precession, consequently, terminate.

As will be well understood, the action of the outer stator 44 is exactly the same when displacement of the gyroscope occurs about the transverse or minor axis; and when the displacement of the gyroscope constitutes a movement thereof about both gimbal axes, then both stators 43 and 44 will be brought into play simultaneously, resulting in a return precessional movement of the gyroscope to correct for the displacement thereof which has immediately preceded.

Figure 3:
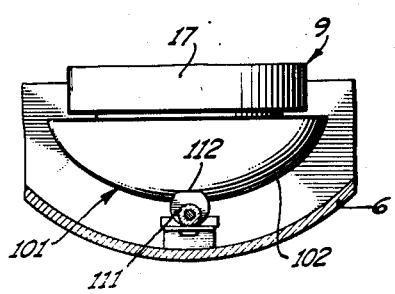
Figure 3 is a detail view in transverse, vertical section taken upon the line 3—3 of Figure 2, with the direction of view indicated by the arrows to show the control for the caging device.

The caging device 101 which has been incorporated with the gyro-vertical of the present invention, also is actuated by friction between a rotating element carried by the rotor of the gyroscope and a friction element or stator carried by the housing 6. The principle of operation of this caging device is the same as that of the erecting mechanism hereinabove described, to the extent that alignment of the parts necessary for caging is attained by erecting the gyroscope to proper position, and the force which is applied to the gyroscope so as to cause it to erect itself in that manner, is derived from the rotor 12, and controlled by a drag imposed by a stator element upon a rotary element carried by the shaft of the gyroscope rotor. Moreover, the caging device is designed so that it will function regardless of the position of the gyroscope within the casing 6, and cause the gyroscope to erect itself to that position in which the caging device can become effective. Toward this end, the rotor of the caging device, which is indicated at 102, comprises a dome-shaped head, the outer surface of which substantially has the form of a spherical zone of one base, referred to herein for convenience as a spherical arc. The center of the spherical surface described by the outer face of the head 102 lies at the intersection 53 of the major and minor gimbal axes; and the head 102 also is provided with a socket in the form of a cylindrical recess 103 disposed co-axially with respect to the shaft 41 of the rotor 12 of the gyroscope. The stator element is a pin 104 substantially complementary in form to the recess 103 and carried by a resilient arm, such as a leaf spring 106, one end of which is attached as by rivets 107' to the inside of the housing 6. Associated with the spring 106 is a control rod 108 journalled in the base of the post 22 and extending through the front wall of the housing 6 so that a knob 109 carried thereby is accessible to the pilot to facilitate turning the rod 108. The inner end of the rod 108 carries an eccentric cam 111, which is provided at its portion of greatest diameter with a flat 112 (see Figure 3). The cam 111 is disposed above the free end of the spring 106, the inherent resilience of which presses its free end upwards into engagement with the cam 111. Hence, when the cam 111 is turned to bring its portion of greatest diameter against the spring 106, the spring will be deflected downwards, so lowering the pin 104 that it is clear of the head 102. When in this position, the cam 111 presents the flat 112 thereof to the spring, and the spring pressing upwards thereagainst will serve to retain the cam 111 against inadvertent displacement from its then position. The operator can, however, simply by turning the knob 109, turn the cam 111 so as to bring the portion of least diameter into alignment with the spring 106, so as to permit the spring 106 to press the pin 104 upwards so that it will, in the event that the recess 103 is in registry therewith, enter that recess and operate as a detent to firmly lock the gyroscope against rotation about either of the gimbal axes, i. e., "cage" the gyroscope. However, in the event that the gyroscope is displaced from that position in which the recess 103 registers with the pin 104 when the spring 106 is released, the upper end of the pin will engage the curved surface of the head 102, thereby developing friction between the spinning head 102 and that stationary pin 104. The point of engagement between the pin and the head will, of course, lie in a radius of the head which extends in the direction of displacement of the recess 103. The friction developed by engagement of the pin against the rotating head will exert a force against the head in a direction perpendicular to that displacement, and, since that force is offset from the axes of the gimbal support of the gyroscope, will manifest itself as an erecting torque perpendicular to the displacement which has preceded the engagement of the pin with the head. Consequently, the gyroscope immediately will be caused to precess in that direction which will bring the recess 103 into registry with the pin 104, whereupon the spring 106 will press the pin into the recess, thus effectively caging the entire structure which is carried by the gimbal bearings.

As stated, the configuration of the outer surface of the head 102 is that of a spherical arc. Preferably, however, the head is relieved adjacent its peripheral edge so that the radius of curvature at this portion 107 of the head is materially less, the purpose being so to reduce the diameter of the head at and adjacent its extreme edge that, should the gyroscope become displaced so far about either or both of the gimbal axes that the pin 104 no longer registers with any portion of the head 102, and the spring 106 then be released permitting the pin 104 to move upwards to its extreme upper position, the head 102 will, upon return of the gyroscope toward its erect position, move over the pin 104 until at least the extreme edge of the head 102 has passed over the pin, whereupon the portion of the head of gradually increasing radius will, as return motion of the gyroscope progresses, be engaged by the pin 104, thus developing the friction which generates an erecting torque as described, the result of which is to cause return of the gyroscope to that position in which the pin 104 and socket 103 are in alignment, and the spring 106 is enabled to drop the pin 104 into the socket.

An important consideration in connection with the caging device 101 is that the head 102 thereof contributes to the successful and dependable operation of the erecting mechanism. When the gyroscope is disposed in its normal position, i. e., with the axis of spin of the rotor substantially vertical, the stators 43 and 44 will exert substantially no pressure against the rotor 42. However, when the gyroscope assumes a position wherein the spinning axis is inclined, one or both of the stators will press with a portion of their weight against the rotor, thereby imposing a torque against the gyroscope which, if not neutralized, would operate as an erecting torque acting in a direction other than that necessary to cause the gyroscope to develop the desired return precessional movement. The head 102 serves so to neutralize whatever gravity-induced torque the stators 43 and 44 might impose upon the gyroscope. Since it is so mounted that its center of gravity is directly below the intersection of the gimbal axes when the gyroscope is in its normal position, it also does not exert any torque upon the gyroscope except when the gyro is displaced from its normal position, and, just as in the case of the stator masses 43 and 44, it does exert torque upon the gyroscope whenever the gyroscope is displaced from the vertical, and of a magnitude which increases as the sine of the angle of such displacement. It is apparent, therefore, that the torque exerted by each of the stator masses and that exerted by the head 102 are in opposite directions about the gimbal axes, and that they both vary substantially equally and correspondingly as the displacement of the gyroscope varies. Accordingly, by designing the head 102 to be of a certain weight as compared with that of the stator masses 43 and 44, and by arranging these parts with their respective centers of gravity in vertical alignment with and at suitable distances from the gimbal axes, the two torques are made to equilibrate each other and thus avoid disturbing the neutral equilibrium of the gyroscope.

I claim:

1. In combination, a gyroscope comprising a casing supported for universal movement about mutually perpendicular axes and a rotor journaled within said casing, a housing for said gyroscope, and caging means therefor comprising a head mounted exteriorly of said casing and connected to said rotor to rotate therewith, the outer face of said head having substantially the form of a spherical arc about a center on the intersection of said axes, and said head having a socket in its outer face at the axis of rotation thereof, a pin adapted to be received within said socket, and means carried by said housing for supporting said pin optionally in position spaced from said head, in frictional engagement therewith, or seated within said socket.

2. In combination, a gyroscope comprising a casing supported for universal movement about mutually perpendicular axes and a rotor journalled within said casing, a housing for said gyroscope, and caging means therefor comprising a head mounted exteriorly of said casing and connected to said rotor to rotate therewith, the outer face of said head having substantially the form of a spherical arc about a center on the intersection of said axes, and said head having a socket in its outer face at the axis of rotation thereof, and means apart from said gyroscope carried by said housing for supporting said pin comprising a spring carrying said pin and pressing it toward said head far enough to enter said socket when aligned therewith, and means operative to withdraw said pin from engagement with said head.

3. A caging device for a gyroscope pivotally mounted for freedom of movement within a housing, said caging device comprising a rotating head revolubly supported by said housing, the outer face of said head having substantially the form of a spherical arc and having a socket therein, a pin removably receivable within said socket, means carried by said housing and yieldably urging said pin toward said head whereby said pin is adapted to make frictional engagement with said head when said gyroscope is so moved as to displace said socket from registry with said pin and thereby generate an erecting torque imposed upon said gyroscope in a direction substantially perpendicular to the direction of said gyroscope's precedent displacement and means for retracting said pin from engagement with said head.

4. A caging device for a gyroscope pivotally mounted for freedom of movement within a housing, said caging device comprising a rotating head revolubly supported by said housing, the outer face of said head having substantially the form of a spherical arc and having a socket therein at its axis, a pin removably receivable within said socket, means carried by said housing and yieldably urging said pin toward said head whereby said pin is adapted to make frictional engagement with said head when said gyroscope is moved to displace said socket from registry with said pin and thereby generate an erecting torque imposed upon said gyroscope in a direction substantially perpendicular to the direction of said gyroscope's precedent displacement, said outer face of said head being of increased curvature adjacent its edge to reduce the radius thereof to a value less than the linear distance between said pin and the center of said outer face.

5. A caging device for a mechanism movably mounted within a casing, comprising a head revolubly mounted on said mechanism and having a socket therein, a stator, means for mounting said stator on said casing and for moving it optionally to position spaced from said head or into frictional engagement therewith, means for rotating said head, and means operative upon displacement of said head from predetermined position and in response to force exerted against said head by said stator angularly with respect to the direction of said displacement for moving said mechanism within said casing until said socket regains said predetermined position.

6. A caging device for a mechanism movably mounted within a casing, comprising a head revolubly mounted on said mechanism and having a socket therein, a stator, means supporting said stator on said casing and comprising a spring urging said stator toward said head far enough to enter a socket therein when said stator and socket are aligned, and means operative upon displacement of said head from predetermined position and in response to force exerted against said head by said stator angularly with respect to the direction of said displacement for moving said mechanism within said casing until said socket becomes aligned with said stator.

7. In a gyroscopic instrument having a housing, a gyroscope comprising a rotor and rotating means therefor and a caging device comprising a head revolubly mounted on said gyroscope and operably coupled to said rotor for rotation therewith, a stator, interengageable latching elements carried by said stator and rotor for caging the gyroscope, means for mounting said stator on said housing in adjustable relationship with respect thereto for movement optionally into or out of engagement with said head for selectively caging said gyroscope and means outside said housing for moving said stator.

8. In a gyroscopic instrument having a housing a gyroscope comprising a rotor and rotating means therefor and a caging device comprising a head revolubly mounted on said gyroscope and operably coupled to said rotor for rotation therewith, a stator, interengageable latching elements carried by said stator and rotor for caging the gyroscope, means for mounting said stator on said housing in adjustable relationship with respect thereto for movement optionally into or out of engagement with said head for selectively caging said gyroscope and manually operable means outside said housing for moving said stator.

THOMAS O. SUMMERS, Jr.

REFERENCES CITED

The following references are of record in the file of this patent:

UNITED STATES PATENTS

| Number | Name | Date |
|---|---|---|
| 1,825,345 | Fieux | Sept. 29, 1931 |
| 1,982,637 | Carlson | Dec. 4, 1934 |